(12) United States Patent
Lim

(10) Patent No.: US 11,975,594 B2
(45) Date of Patent: May 7, 2024

(54) COOLANT HEATER

(71) Applicant: Hanon Systems, Daejeon (KR)

(72) Inventor: Cha You Lim, Daejeon (KR)

(73) Assignee: Hanon Systems, Daejeon (KR)

( * ) Notice: Subject to any disclaimer, the term of this patent is extended or adjusted under 35 U.S.C. 154(b) by 764 days.

(21) Appl. No.: 17/058,603

(22) PCT Filed: May 27, 2019

(86) PCT No.: PCT/KR2019/006326
§ 371 (c)(1),
(2) Date: Nov. 24, 2020

(87) PCT Pub. No.: WO2019/231193
PCT Pub. Date: Dec. 5, 2019

(65) Prior Publication Data
US 2021/0213803 A1   Jul. 15, 2021

(30) Foreign Application Priority Data

May 28, 2018  (KR) .................. 10-2018-0060253

(51) Int. Cl.
| | |
|---|---|
| *B60H 1/22* | (2006.01) |
| *F24H 1/12* | (2022.01) |
| *F24H 9/02* | (2006.01) |
| *F24H 9/14* | (2006.01) |
| *F24H 9/18* | (2022.01) |

(52) U.S. Cl.
CPC ............ *B60H 1/22* (2013.01); *F24H 1/12* (2013.01); *F24H 9/02* (2013.01); *F24H 9/14* (2013.01); *F24H 9/18* (2013.01); *B60H 2001/2278* (2013.01)

(58) Field of Classification Search
CPC ..... B60H 1/22; B60H 2001/2278; F24H 1/12; F24H 9/02; F24H 9/14; F24H 9/18
See application file for complete search history.

(56) References Cited

U.S. PATENT DOCUMENTS

| | | | |
|---|---|---|---|
| 2012/0237192 A1* | 9/2012 | Kominami | ............ F24H 9/2028 392/480 |
| 2013/0220987 A1* | 8/2013 | Himeno | ................... H05B 3/24 219/202 |

(Continued)

FOREIGN PATENT DOCUMENTS

| | | |
|---|---|---|
| JP | 2013-220706 A | 10/2013 |
| KR | 10-2013-0099462 A | 9/2013 |
| KR | 10-2015-0004382 A | 1/2015 |

(Continued)

OTHER PUBLICATIONS

English translation of KR1020170073973 (Lim et al.) provided by Applicant, Jun. 29, 2017. (Year: 2017).*

*Primary Examiner* — Marc E Norman
(74) *Attorney, Agent, or Firm* — Norton Rose Fulbright US LLP; James R. Crawford

(57) ABSTRACT

The present invention relates to a coolant heater. The objective of the present invention is to provide a coolant heater, wherein an assembly formed by stacking sheet-type heaters is integrated with a housing in which coolant circulates, so as to minimize heat loss and thus maximize heating efficiency and achieve free capacity diversification through a sheet-stacking shape.

12 Claims, 7 Drawing Sheets

(56) References Cited

U.S. PATENT DOCUMENTS

2016/0195341 A1* 7/2016 Kominami ........... B60H 1/2218
                                                                               165/82
2020/0039324 A1* 2/2020 Adachi ..................... F24H 1/10

FOREIGN PATENT DOCUMENTS

| KR | 10-2015-0070771 A | 6/2015 |
| KR | 10-2017-0035052 A | 3/2017 |
| KR | 10-2017-0073973 A | 6/2017 |

* cited by examiner

COOLANT HEATER

CROSS REFERENCE TO RELATED APPLICATIONS

This application is a national phase under 35 U.S.C. § 371 of International Application No. PCT/KR2019/006326 filed May 27, 2019, which claims the benefit of priority to Korean Patent Application No. 10-2018-0060253 filed on May 28, 2018. The entire contents of these applications are incorporated herein by reference in their entirety.

TECHNICAL FIELD

The present invention relates to a coolant heater, and more particularly, to a coolant heater capable of maximizing heating efficiency and freely diversifying its capacity.

BACKGROUND ART

A vehicle having an engine, which uses gasoline, diesel or the like as its energy source, as its driving source is the most general type of vehicle these days. However, the necessity for a new energy source has been gradually increased due to various problems such as an environmental pollution, a decrease in oil reserves and the like, which are caused by energy sources for a vehicle. Therefore, an electric vehicle, a hybrid vehicle, a fuel cell vehicle and the like, are currently being commercialized or under development.

However, the electric vehicle, the hybrid vehicle and the fuel cell vehicle are impossible or difficult to adopt a heating system using a coolant, unlike the vehicle having the engine which uses petroleum as its energy source according to the prior art. That is, in the prior art vehicle having the engine which uses the petroleum as its energy source, a large amount of heat may be generated in the engine. Accordingly, the prior art vehicle may adopt a coolant flow system for cooling the engine and use heat absorbed by the coolant from the engine to heat a vehicle interior. However, the large amount of heat as generated in the engine may not be generated in driving sources of the electric vehicle, the hybrid vehicle and the fuel cell vehicle, there has thus been a limitation in using a prior art heating system in these vehicles.

Therefore, there has been conducted various studies on a heating system of the electric vehicle, the hybrid vehicle, the fuel cell vehicle or the like as follows: the vehicle may have a heat pump added to an air conditioning system to be used as a heat source, or may use a separate heat source such as an electrical heater. Here, among these systems, the electrical heater may more easily heat a coolant without significantly affecting the air conditioning system, and has thus been widely used. Here, the electric heater may be divided into an air heating type heater that directly heats the air blown into the vehicle interior and a coolant heating type heater (or coolant heater) that heats the coolant.

An example of the coolant heater is disclosed in Korean Patent Laid-Open Publication No. 2015-0004382 (entitled "HEATING DEVICE FOR A VEHICLE AND METHOD FOR OPERATING SAID HEATING DEVICE" and published on Jun. 12, 2015; hereinafter, referred to as the prior art). In more detail, the prior art discloses the coolant heater having a structure in which a flow path, through which a liquid heat transport medium flows on a heating element having a thin surface, is formed in a shape of serpentine channels, as shown in FIGS. 1A and 1B. The coolant heater according to the prior art has at least two channels through which the heat transport medium flows in parallel, and may thus have a lower pressure loss on a heating section when compared to a single channel or channels connected in series.

However, as shown in its specific structure of FIG. 1B, the coolant heater according to the prior art has the following various problems: only one side of the heating element is used for heating the coolant, heat loss may thus inevitably occur on the opposite side, this waste heat lost in this way may reduce the efficiency of a control unit, it is difficult to change capacity of the heater because only one heating element is used, the prior art coolant heater is less suitable for being packed because its heating element having such a thin surface is spread out and positioned, etc.

Accordingly, there has been steadily conducted a study on a coolant heater having an improved structure which enables its enhanced efficiency based on minimized heat loss, diverse capacity and compact packaging.

PRIOR ART DOCUMENT

Patent Document

1. Korean Patent Laid-Open Publication No. 2015-0004382 (entitled "HEATING DEVICE FOR A VEHICLE AND METHOD FOR OPERATING SAID HEATING DEVICE" and published on Jan. 12, 2015)

DISCLOSURE

Technical Problem

The objective of the present invention is to provide a coolant heater in which an assembly formed by stacking sheet-type heaters on each other is integrated with a case, through which a coolant flows, so as to maximize heating efficiency by minimizing heat loss and simultaneously to freely diversify its capacity through a sheet-stacking shape.

Technical Solution

In one general aspect, a coolant heater 100 includes: a heater assembly 110 including a plurality of heater units 111 arranged to be stacked on each other and each having a flow space in which a coolant flows, a plurality of heating sheets 112 interposed between the heater units 111; a pump 120 pumping the coolant to introduce the coolant into the flow space; and a case 130 including a pair of case halves 135 coupled with each other to accommodate the heater assembly 110 and the pump 120, and a coolant inlet 131 introducing the coolant into the pump 120 and a coolant outlet 132 discharging the coolant discharged from the heater assembly 110.

Here, the heater unit 111 may include a unit body 113 having a pair of coolant flow holes 115 formed in one side thereof and having a shape of a container one surface of which is open, and a unit cover 114 covering the open one surface of the unit body 113 to form the flow space, and the coolant introduced to one coolant flow hole 115 among the pair of coolant flow holes 115 may be heated by the heating sheet 112 adjacent to the heater unit 111 and then discharged to the other coolant flow hole 115.

In addition, here, the unit body 113 may include a partition wall 116 having one end connected to the inner wall surface of the unit body 113, positioned between the pair of coolant flow holes 115 and extending along the unit body 113, and the coolant introduced to the one coolant flow hole 115 among the pair of coolant flow holes 115 may be guided along the flow space separated by the partition wall 116 and then discharged to the other coolant flow hole 115.

In addition, here, in the heater assembly 110, the coolant flow holes 115 of the adjacent heater unit bodies 111 may be in communication with each other, and each coolant flow hole 115 which is not in communication with another adjacent heater unit 111 among the coolant flow holes 115 formed in the outermost heater unit 111, may introduce or discharge the coolant, and the coolant may be heated while flowing sequentially from the outermost heater unit 111 on one side to the outermost heater unit 111 on the other side.

In addition, the case 130 may have its interior partitioned into a heater accommodation space H accommodating the heater assembly 110 and a pump accommodation space P accommodating the pump 120, the heater accommodation space H and the pump accommodation space P being separate from each other. Here, the case 130 may include a flow path introducing the coolant introduced into the pump accommodation space P into the heater assembly 110.

In addition, in the coolant heater 100, the pump 120 may be formed in a cylindrical shape, and the heater assembly 110 may be formed to partially surround the circumference of a side surface of the pump 120.

In addition, one heating sheet 112 or the plurality of heating sheets 112 may be positioned per one heater unit 111. Here, in the case where the plurality of heating sheets 112 are positioned per the one heater unit 111, the plurality of heating sheets 112 positioned on the one heater unit 111 may be electrically connected in series or in parallel with each other.

In addition, the coolant heater 100 may further include: a terminal block 145 supplying power by electrically connecting the heating sheets 112 positioned on the plurality of heater units 111 in series or in parallel with each other; and a controller 140 connected to the terminal block 145 and controlling the power supplied to the heating sheet 112.

Here, the terminal block 145 may be formed to extend in a direction in which the heater units 111 are stacked on each other.

In addition, the controller 140 may be formed in the shape of a substrate and stacked in parallel with the plurality of heater units 111. Here, the controller 140 may be positioned to be spaced apart from the heater assembly 110.

Advantageous Effects

The present invention introduces a new structure that enables an assembly formed by stacking sheet-type heaters on each other to be integrated with a housing through which a coolant flows, thereby obtaining the following various effects.

First, according to the present invention, sheet-type heating elements may be arranged to be stacked on each other, and heat generated from the opposite surfaces of the heating elements may thus be completely used. Accordingly, the present invention may have minimized heat loss, and accordingly, maximized heating efficiency. In addition, the present invention has such a stacking type structure, and may thus adjust the number of the sheet-type heating elements stacked on each other. Accordingly, the present invention may freely diversify capacity of the heater as needed.

In addition, the coolant heater according to the present invention may have not only a basic structure in which several small sheet-type heating elements are stacked on each other, but also a structure in which the assembly of these sheet-type heating elements is integrated with and positioned in the housing through which the coolant flows and the pump is also integrated with and positioned in the housing. Accordingly, the present invention may have a remarkably improved packaging advantage. In addition, the present invention has the various components integrated with each other as described above, thereby having the reduced number of components and obtaining even the economic effect of cost reduction based thereon.

In addition, according to the present invention, a controller may be positioned on one side of the assembly formed by stacking the sheet-type heating elements on each other, and the coolant may flow between the controller and the heating element, thereby effectively maintaining the controller to be cooled. Accordingly, the controller may be prevented from having its efficiency reduced by heat radiation, and thus have its improved operation efficiency as a result.

DETAILED DESCRIPTION OF MAIN ELEMENTS

Figure 1A:
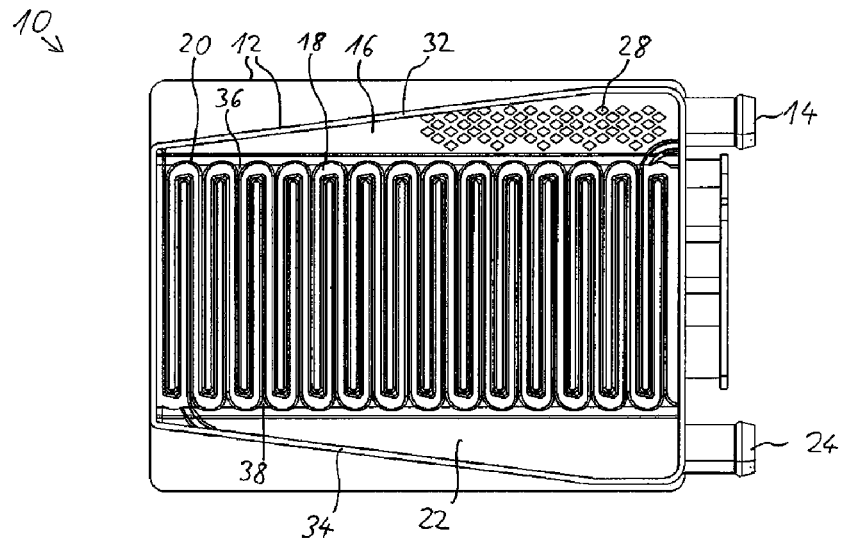
FIGS. 1A and 1B are views each showing an embodiment of a coolant heater according to a prior art.
Figure 1B:
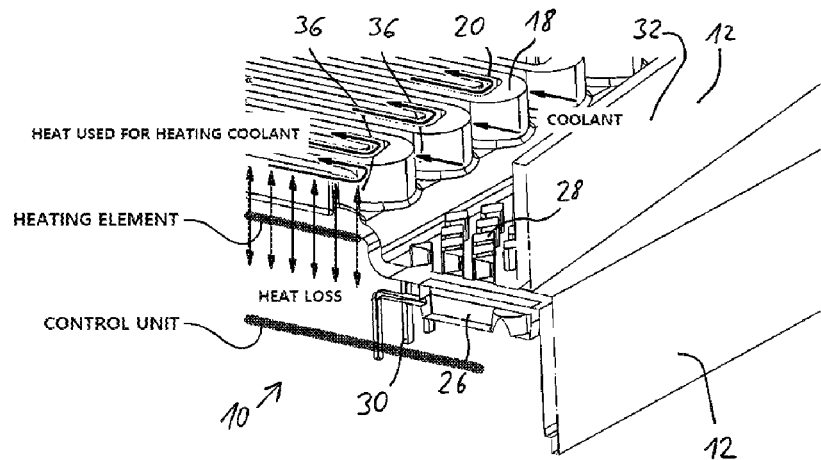

100: coolant heater
110: heater assembly
111: heater unit
112: heating sheet
113: unit body
114: unit cover
115: coolant flow hole
116: partition wall
120: pump
125: heat sink
130: case
131: coolant inlet
132: coolant outlet
135: case half
140: controller
145: terminal block Best Mode Hereinafter, a coolant heater according to the present invention having the configuration as described above is described in detail with reference to the accompanying drawings.

[Overall Structure of Coolant Heater]

Figure 2:
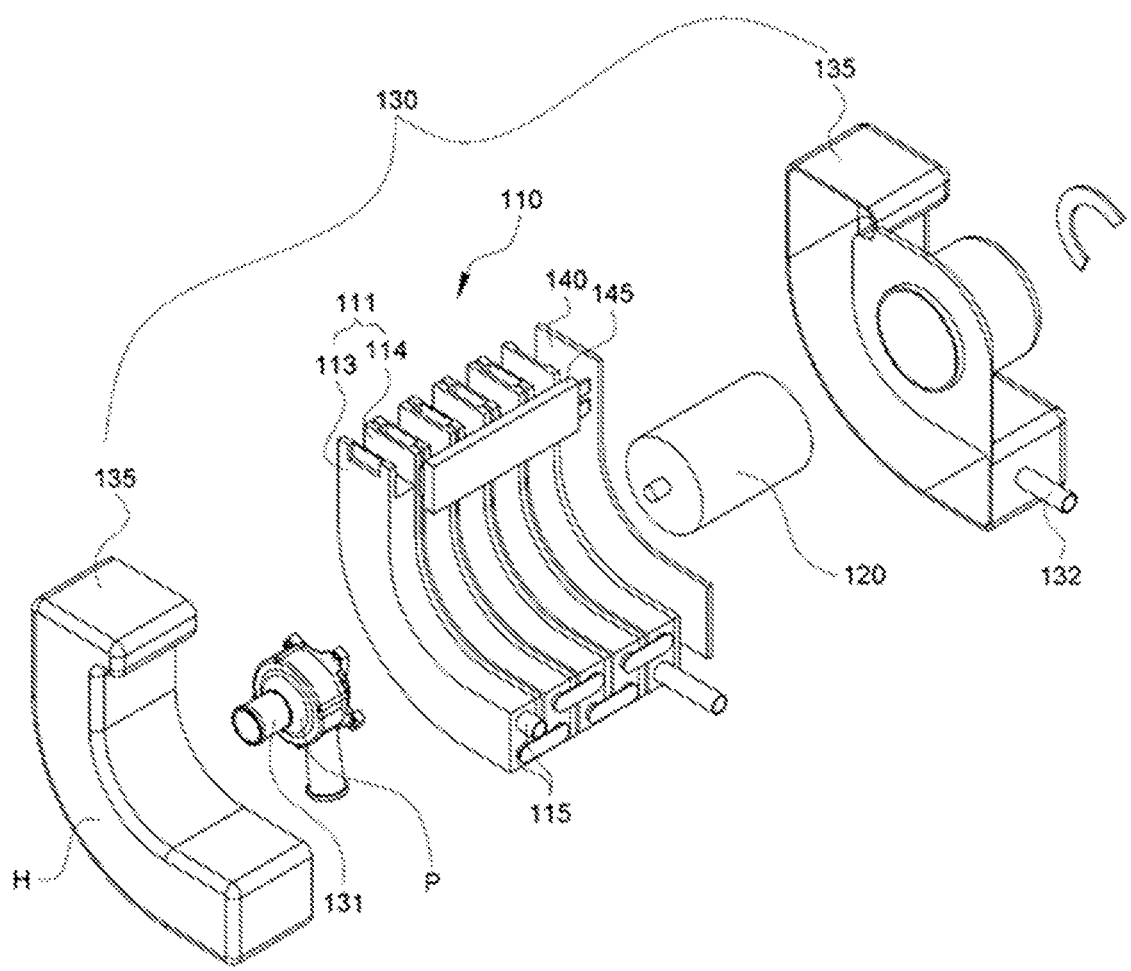
FIG. 2 is an exploded perspective view of a coolant heater according to the present invention.
Figure 3:
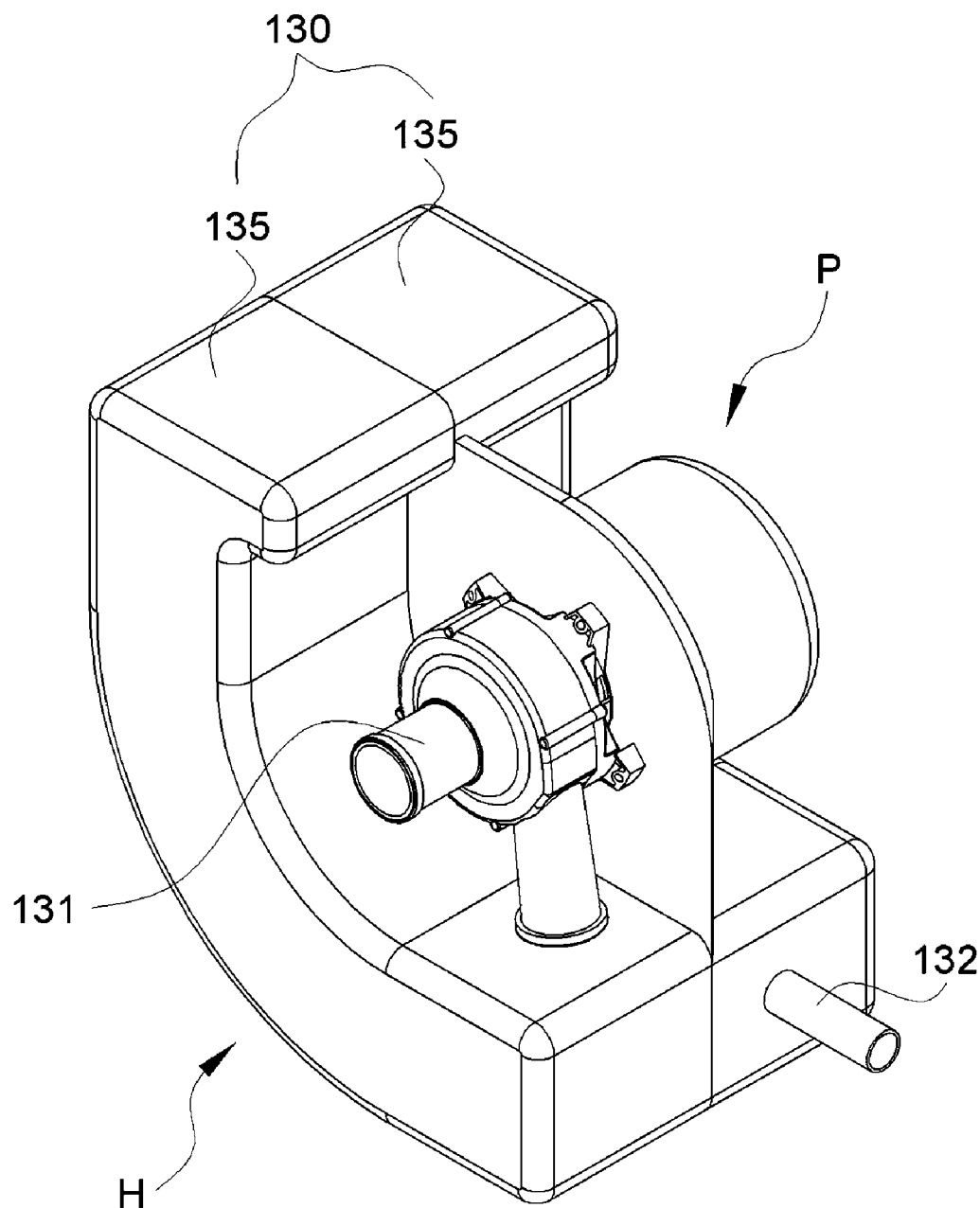
FIG. 3 is an assembly perspective view of the coolant heater according to the present invention.

FIG. 2 is an exploded perspective view of a coolant heater according to the present invention, and FIG. 3 is an assembly perspective view of the coolant heater according to the present invention. These drawings each show the overall shape of a coolant heater 100 according to the present invention. As shown in FIGS. 2 and 3, the coolant heater 100 of the present invention includes: a heater assembly 110 including a plurality of heater units 111 arranged to be stacked on each other; a pump 120 forcing a coolant to flow; and a case 130 receiving and supporting these components. The following is a more detailed description of each component.

Figure 4A:
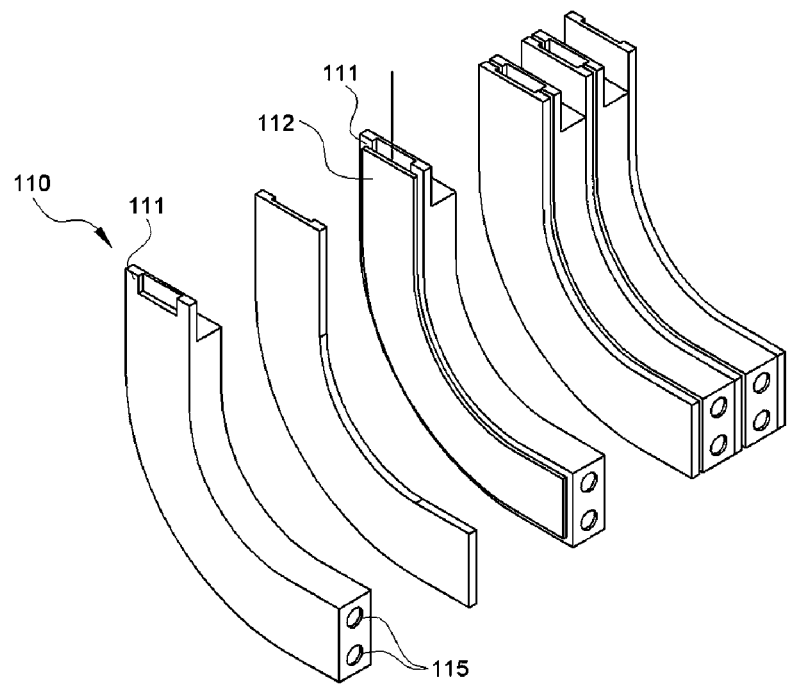
FIGS. 4A and 4B are views each showing a partial exploded perspective view of the coolant heater according to the present invention.
Figure 4B:
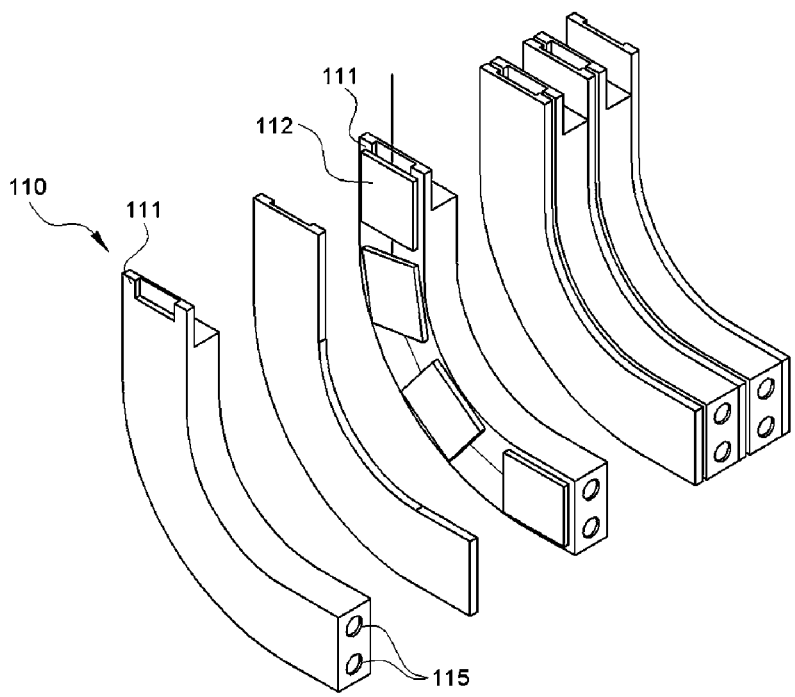

As described above, the heater assembly 110 may have the plurality of heater units 111 arranged to be stacked on each other, the heater units 111 each having a flow space in which the coolant flows. FIGS. 4A and 4B is a view showing a partial exploded perspective view of the coolant heater according to the present invention. As shown in FIGS. 4A and 4B, a heating sheet 112 may be interposed between the heater units 111. That is, the heater assembly 110 may be formed in a shape in which each of the heater units 111 in which a coolant flows and each of the heating sheets 112 radiating heat depending on power supply are alternately stacked on each other. Therefore, the opposite surfaces of one heating sheet 112 may be brought into surface contact with an adjacent pair of heater units 111, respectively, and heat radiated from the opposite surfaces of the heating sheet 112 may be transferred to the pair of heater units 111 and used to heat the coolant flowing therein. As described above, according to the present invention, there is no heat loss, i.e. heat which is not used for heating the coolant and wasted from the heat radiated from the heating sheet 112. Accordingly, the present invention may have maximized device efficiency.

Meanwhile, one heating sheet 112 may be positioned per one heater unit 111 as shown in FIG. 4A, or a plurality of heating sheets 112 may be positioned per one heater unit 111 as shown in FIG. 4B. In the case where the plurality of heating sheets 112 are positioned per the one heater unit 111, the plurality of heating sheets 112 positioned on the one heater unit 111 may be electrically connected in series with each other as shown in FIG. 4B. The present invention is not necessarily limited to such a connection type. Although not shown, the plurality of heating sheets 112 may be electrically connected in parallel with each other depending on the specifications of the heating sheet 112 or user needs.

The pump 120 may serve to pump the coolant and introduce the coolant into the flow space. Here, the pump 120 may be formed in a cylindrical shape, and the heater assembly 110 may be formed to partially surround the circumference of a side surface of the pump 120 as shown in the drawings, thereby making the device more compact.

As shown in the drawings, in the case 130, a pair of case halves 135 may be coupled with each other to accommodate the heater assembly 110 and the pump 120. As described above, the present invention may allow the heater assembly 110 and the pump 120 to be accommodated in the one case 130 and integrated with each other, thereby maximizing the miniaturization of the device and the space utilization of the engine room. In the case where the pump 120 is accommodated in the case 130 as above, it is preferable that a heat sink 125 capable of effectively radiating heat generated from the pump 120 is positioned on one side of a pump accommodation space P accommodating the pump 120.

The case 130 may be formed to have a coolant inlet 131 introducing the coolant into the pump 120 and a coolant outlet 132 discharging the coolant discharged from the heater assembly 110. Here, as shown in FIGS. 2 and 3, it is preferable that the case 130 has its interior partitioned into a heater accommodation space H accommodating the heater assembly 110 and the pump accommodation space P accommodating the pump 120, the heater accommodation space H and the pump accommodation space P being separate from each other.

The coolant inlet 131 may be configured to communicate with the pump accommodation space P, and the coolant pumped by the pump 120 and introduced into the pump accommodation space P may be introduced into the flow space in the heater unit 111 configuring the heater assembly 110. In order to facilitate this introduction of the coolant, it is preferable that the case 130 includes a flow path introducing the coolant introduced into the pump accommodation space P into the heater assembly 110. This flow path may be variously modified, and for example, may be formed of a separate pipe or the like, or formed to have each recess at an appropriate position on the case halves 135 configuring the case 130 and then coupling the case halves 135 to each other.

As the case 130 has the structure as described above, the coolant may be pumped by the pump 120 and introduced into the pump accommodation space P through the coolant inlet 131, and then flow into the heater assembly 110 through the flow path. However, the coolant may be heated by heat radiated from the heating sheet 112 while passing through the heater assembly 110, and then discharged to the outside of the coolant heater 100 through the coolant outlet 132. In this way, the coolant may be prevented from penetrating into the heater accommodation space H itself, and may flow only within the heater assembly 110 accommodated in the heater accommodation space H. Therefore, the heating sheet 112 positioned in the heater assembly 110 and other electronic components may be positioned together in the heater accommodation space H. As such, there is no need to position the electronic components separately from the heating sheet 112 and it is thus possible to make the device more compact.

[Specific Structure of Heater Unit]

Figure 5:
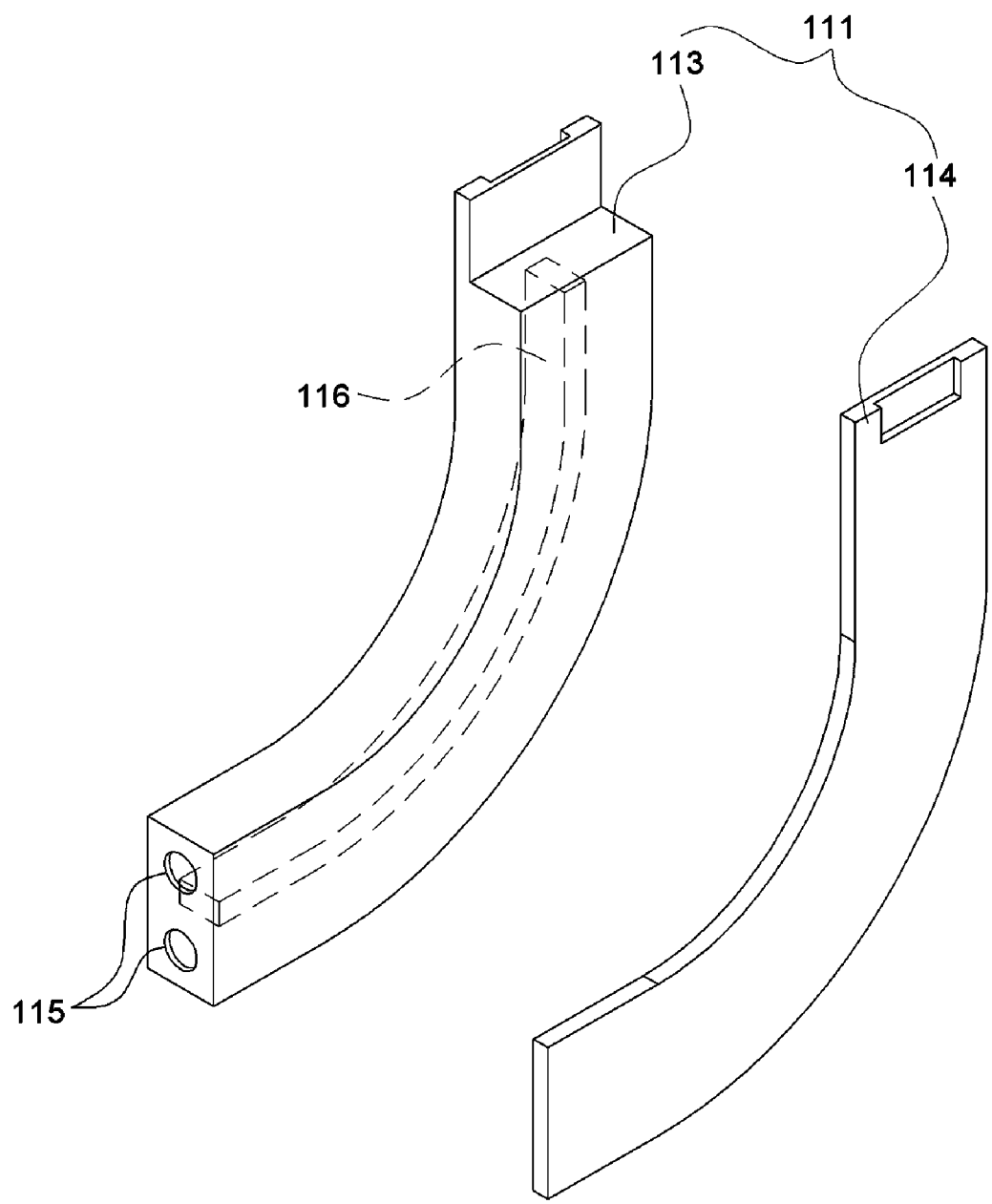
FIG. 5 is a perspective view of the coolant heater unit according to the present invention.

FIG. 5 is a perspective view of the coolant heater unit according to the present invention. A specific structure of the heater unit 111 is described in more detail with reference to FIG. 5.

The heater unit 111 may be formed to include a unit body 113 and a unit cover 114, as shown in FIG. 5. The unit body 113 may have a pair of coolant flow holes 115 formed in one side thereof and may have a shape of a container one surface of which is open, and the unit cover 114 may cover the open one surface of the unit body 113 to form the flow space. In this way, the coolant introduced to one coolant flow hole 115 among the pair of coolant flow holes 115 may be heated by the heating sheet 112 adjacent to the heater unit 111 and then discharged to the other coolant flow hole 115.

Here, as also shown in FIG. 5, it is preferable that the unit body 113 includes a partition wall 116 having one end connected to the inner wall surface of the unit body 113, positioned between the pair of coolant flow holes 115, and extending along the unit body 113. The partition wall 116 may be connected to the inner wall surface adjacent to the coolant flow holes 115, and may be open without being connected to the surface opposite to the inner wall surface adjacent to the coolant flow holes 115. Accordingly, the coolant introduced to the one coolant flow hole 115 among the pair of coolant flow holes 115 may be smoothly guided along the flow space separated by the partition wall 116 and then discharged to the other coolant flow hole 115. As the coolant flow may be guided in this way, the coolant may flow and pass all the heater units 111. Therefore, the coolant may receive all the heat radiated from the heating sheets 112 positioned on all the heater units 111 without loss, thereby further improving heating efficiency.

In this way, even with only one heater unit 111, the coolant may be completely introduced, heated and discharged, and the heater assembly 110, which is formed by stacking the plurality of the heater units 111 on each other, may diversify its capacity as needed by appropriately controlling the number of the heater units 111. That is, the number of stacked heater units 111 may be reduced if a small amount of heated coolant is required, and the number of stacked heater units 111 may be increased in the opposite case, thereby freely adjusting the capacity of the heater assembly 110 as needed.

Here, as shown in FIGS. 2, 4, 5 and the like, in the heater assembly 110, the coolant flow holes 115 of the adjacent heater units 111 may be in communication with each other, and each coolant flow hole 115 which is not in communication with another adjacent heater unit 111 among the coolant flow holes 115 formed in the outermost heater unit 111 may introduce or discharge the coolant. As the heater unit 111 is formed in this way, the coolant may be heated while flowing smoothly and sequentially from the outermost heater unit 111 on one side to the outermost heater unit 111 on the other side.

Meanwhile, as shown in FIGS. 2, 4, 5 and the like, it is preferable that the pair of coolant flow holes 115 formed in the heater unit 111 is positioned in a direction perpendicular to a direction in which the heater units 111 are stacked on each other. As described above, the coolant may flow in the heater assembly 110 as follows: the coolant discharged from one heater unit 111 is introduced to another heater unit 111, and this flow is repeated, thereby making it possible for the coolant to flow and pass all the heater units 111. For example, it is assumed that the heater assembly 110 includes a first heater unit, a second heater unit, ..., an n-th heater unit, that is, the n number of the heater units 111 stacked on each other. Here, a coolant flow hole into which the coolant is introduced from the first heater unit may receive the coolant which is pumped by the pump 120 through the coolant inlet 131, and then supplied through the flow path. In addition, a coolant flow hole through which the coolant is discharged from the first heater unit and a coolant flow hole through which the coolant is introduced from the second heater unit may be in communication with each other, a coolant flow hole through which the coolant is discharged from the second heater unit and a coolant flow hole through which the coolant is introduced from the third heater unit may be in communication with each other, ..., and this communication structure may be repeated. The last coolant flow hole through which the coolant is discharged from the n-th heater unit may be connected to the coolant outlet 132 to finally discharge the heated coolant to the outside of the coolant heater 100. Here, the pair of coolant flow holes 115 may be positioned in a direction perpendicular to the direction in which the heater units 111 are stacked on each other, and the upper coolant flow holes of the first and second heater units may be in communication with each other, the lower coolant flow holes of the second and third heater units may be in communication with each other, and this communication structure may be repeated. That is, it is possible to easily implement the communication structure as shown in FIG. 2 or 4, thereby greatly facilitating manufacture of the present invention.

Meanwhile, as described above, the heater unit 111 may have the flow space in which the coolant flows. However, the flow space may not necessarily be formed in the same shape as shown in the embodiment of FIG. 5, and may be formed in the shape of a bent pipe for example. However, in the case where the heater unit 111 is formed in the shape of the bent pipe, an area in which the heater unit 111 is in contact with the heating sheet 112 may be reduced, and the heating efficiency of the coolant may thus be reduced, etc. That is, the structure of the heater unit 111 shown in FIG. 5 is an embodiment in which the heater unit 111 is designed to have its optimized shape in consideration of various aspects such as smooth flow of the coolant, heat transfer efficiency and its easy manufacture. However, the present invention is not limited to this shape, and may be variously modified.

[Connection Structure of Controller and Terminal Block]

Figure 6:
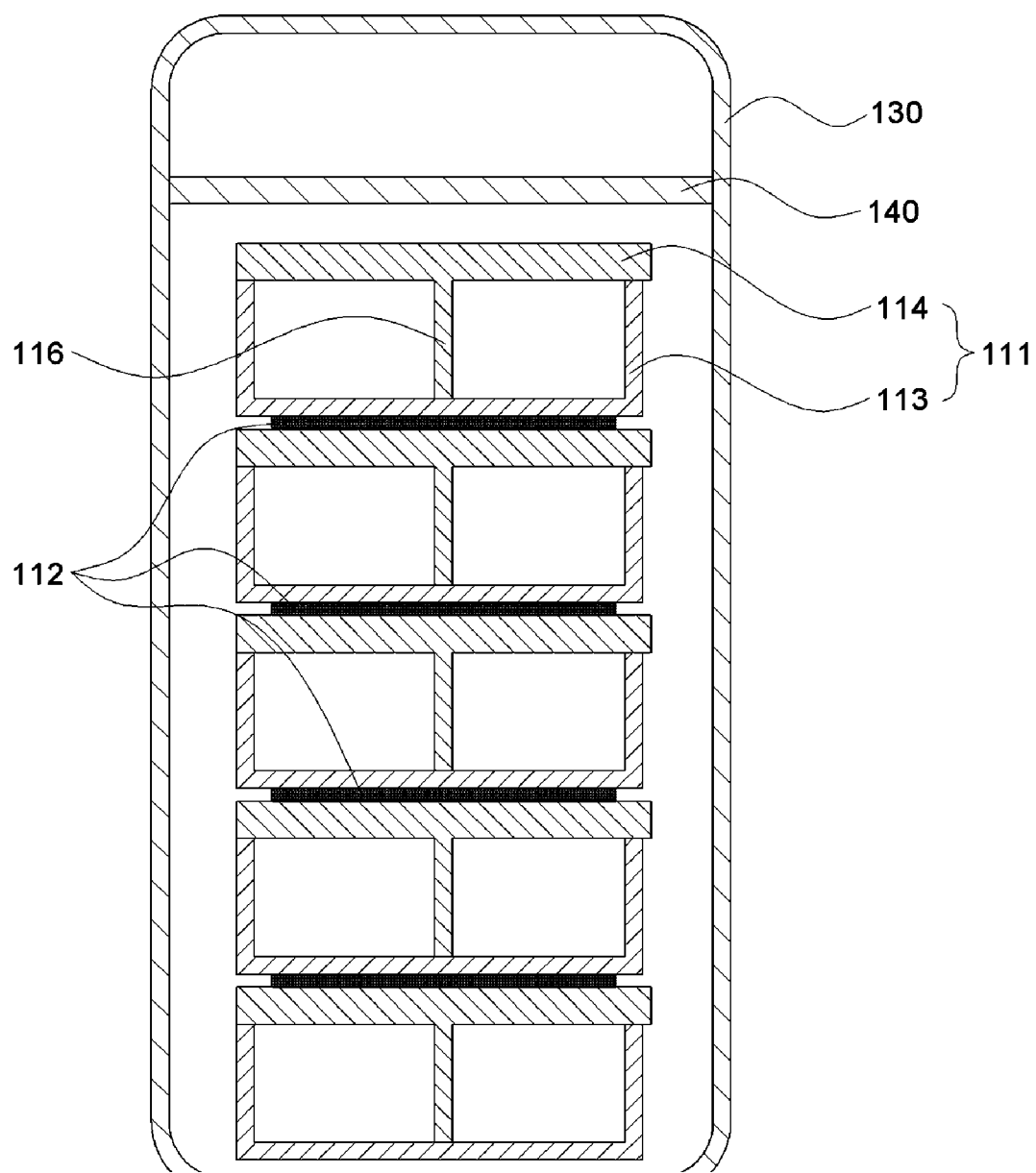
FIG. 6 is a cross-sectional view of a coolant heater unit according to the present invention.
Figure 7A:
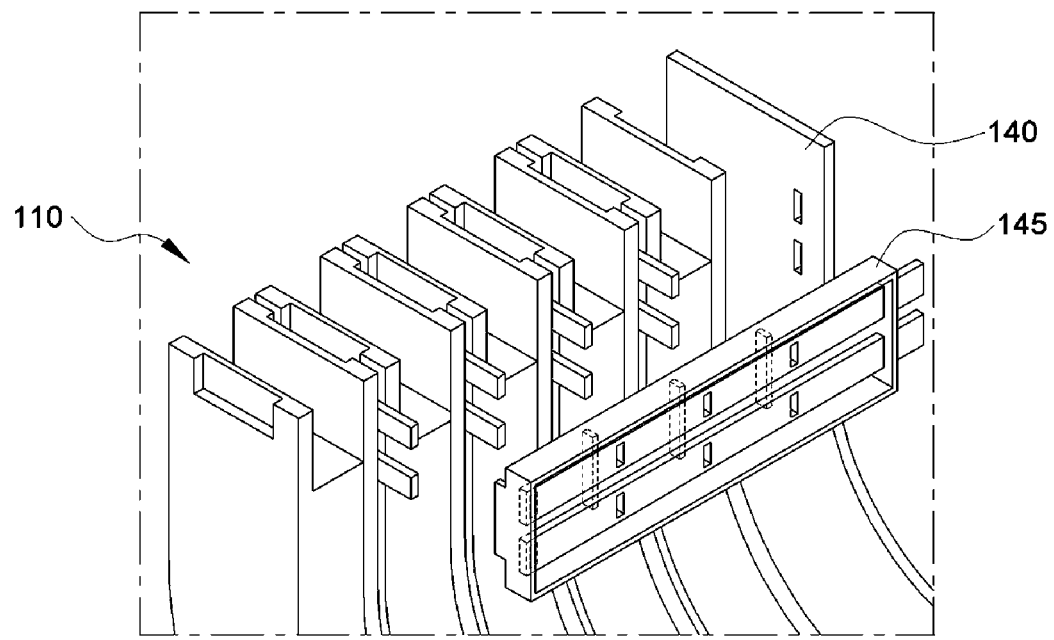
FIGS. 7A and 7B are views each showing a state in which a heater assembly, a controller and a terminal block are assembled with or disassembled from one another.
Figure 7B:
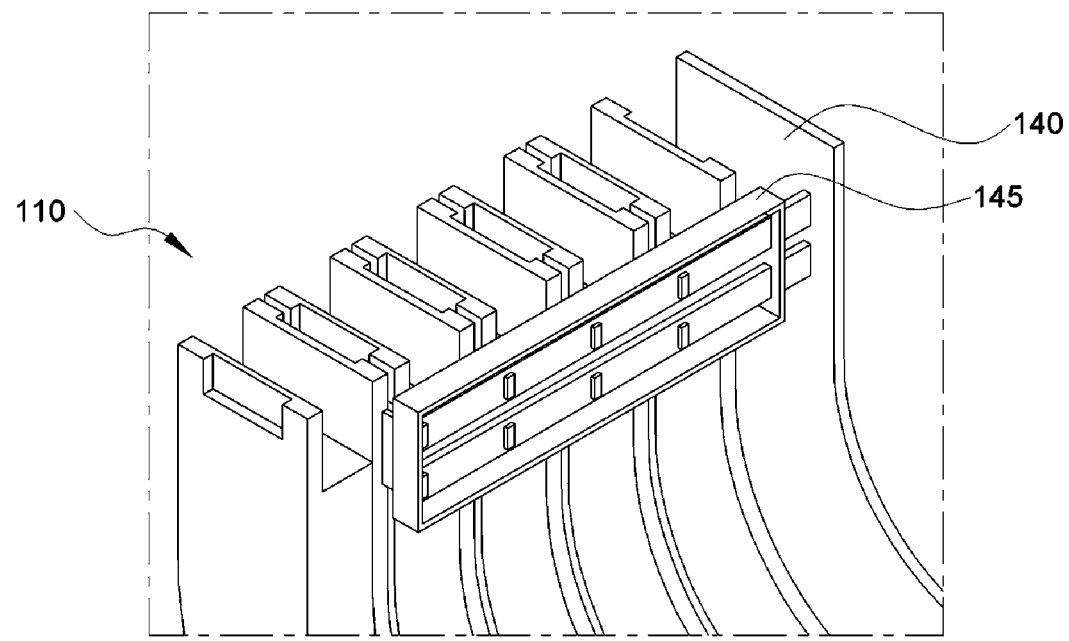

FIG. 6 is a cross-sectional view of a coolant heater unit according to the present invention, and FIGS. 7A and 7B are views each showing a state in which a heater assembly, a controller and a terminal block are assembled with or disassembled from one another.

As described above, the present invention may have the plurality of the heater units 111 arranged to be stacked on each other and the heating sheet 112 interposed between the heater units 111. Here, one heating sheet 112 may be positioned per one heater unit 111 as exemplarily shown in FIG. 4A above, but the plurality of heating sheets 112 may be positioned per one heater unit 111 as exemplarily shown in FIG. 4B above. In the case where the plurality of heating sheets 112 are positioned per the one heater unit 111, as described above, the plurality of heating sheets 112 positioned on the one heater unit 111 may be electrically connected in series or in parallel with each other depending on the specifications of the heating sheet 112 or user needs. For example, in a case where a high voltage is to be applied to the heating sheet 112, if the plurality of the heating sheets 112 are electrically connected in series with each other, the voltage applied to the heating sheet 112 may be easily increased to a high voltage of 800V or higher.

Meanwhile, in order to smoothly supply power to the heating sheets 112 each positioned between the heater units 111, it is preferable that the coolant heater 100 further includes a terminal block 145 and a controller 140.

The terminal block 145 may serve to supply the power by electrically connecting the heating sheets 112 positioned on the plurality of heater units 111 in series or in parallel with each other. In order for the terminal block 145 to facilitate electrical connection between the heating sheets 112 and for these two components to be efficiently packaged together, it is preferable that the terminal block 145 is formed to extend in the direction in which the heater units 111 are stacked on each other, as shown in FIGS. 2 and 7. In addition, the description above describes that in the case where the plurality of heating sheets 112, which are connected in series with each other, are positioned on the one heater unit 111, a considerable high voltage may be applied to the one heater unit 111. If sets of the plurality of the heating sheets are again connected in series with each other, the voltage may be excessively high. In this case, it is thus preferable that the terminal block 145 is configured to supply the power by having the heating sheets 112 connected in parallel with each other. On the contrary, in the case where the plurality of heating sheets 112, which are connected in parallel with each other, are positioned on the one heater unit 111, the terminal block 145 may be configured to supply the power by having the heating sheets 112 connected in series with each other in order to increase the voltage. However, the present invention is not necessarily limited to the connection types above. As described above, the electrical connection between the plurality of heating sheets 112 positioned on the one heater unit 111 and the electrical connection performed by the terminal block 145 for the power supply may select and use either a serial connection or a parallel connection depending on component specifications or user needs.

The controller 140 may be connected to the terminal block 145 and serve to control the power supplied to the heating sheet 112. Here, the controller 140 may be formed in the shape of a substrate and stacked in parallel with the plurality of heater units 111. Here, as shown in FIGS. 2, 6, and 7, it is preferable that the controller 140 is positioned to be spaced apart from the heater assembly 110. In describing the prior art at the beginning of the description, it is pointed out that in the prior art coolant heater, the waste heat, which is not used for heating the coolant and wasted from the heating sheet 112, may be transferred to the control unit, thereby reducing the operation efficiency of the control unit. However, according to the present invention, the controller 140 may be positioned to be spaced apart from the heater assembly 110 in which the coolant is heated, and prevented from being affected by the heat radiated from the heating sheet 112. In addition, even though one heating sheet 112 is positioned closest to the controller 140, the heater unit 111 accommodating the coolant may be positioned between the controller 140 and the one heating sheet 112. Therefore, the heat radiated from the heating sheet 112 may be effectively blocked by the coolant, and thus be more effectively prevented from unnecessarily transferring to the controller 140.

The present invention is not limited to the above-mentioned embodiments, but may be variously applied. In addition, the present invention may be variously modified by those skilled in the art to which the present invention pertains without departing from the gist of the present invention claimed in the claims.

INDUSTRIAL APPLICABILITY

The present invention introduces a new structure that enables an assembly formed by stacking sheet-type heaters on each other to be integrated with a housing through which a coolant flows, which may obtain the following various effects: maximized heating efficiency, free capacity diversification of the heater, improved operation efficiency of a controller, improved packaging advantage, reduced number of components, the economic effect of cost reduction based thereon, etc.

The invention claimed is:

1. A coolant heater comprising: a heater assembly including a plurality of heater units arranged to be stacked on each other and each having a flow space in which a coolant flows, and a plurality of heating sheets interposed between the heater units; a pump pumping the coolant to introduce the coolant into the flow space; and a case including a pair of case halves coupled with each other to accommodate the heater assembly and the pump, and a coolant inlet introducing the coolant into the pump and a coolant outlet discharging the coolant discharged from the heater assembly; and
wherein the heater unit includes a unit body having a pair of coolant flow holes formed in one side thereof and having a shape of a container one surface of which is open, and a unit cover covering the open one surface of the unit body to form the flow space, and the coolant introduced to one coolant flow hole among the pair of coolant flow holes is heated by the heating sheet adjacent to the heater unit and then discharged to the other coolant flow hole.

2. The coolant heater of claim 1, wherein the unit body includes a partition wall having one end connected to the inner wall surface of the unit body, positioned between the pair of coolant flow holes and extending along the unit body, and the coolant introduced to the one coolant flow hole among the pair of coolant flow holes is guided along the flow space separated by the partition wall and then discharged to the other coolant flow hole.

3. The coolant heater of claim 1, wherein in the heater assembly, the coolant flow holes of the adjacent heater unit bodies are in communication with each other, and each coolant flow hole which is not in communication with another adjacent heater unit among the coolant flow holes formed in the outermost heater unit, introduces or discharges the coolant, and the coolant is heated while flowing sequentially from the outermost heater unit on one side to the outermost heater unit on the other side.

4. The coolant heater of claim 1, wherein the case has its interior partitioned into a heater accommodation space H accommodating the heater assembly and a pump accommodation space P accommodating the pump, the heater accommodation space H and the pump accommodation space P being separate from each other.

5. The coolant heater of claim 4, wherein the case includes a flow path introducing the coolant introduced into the pump accommodation space P into the heater assembly.

6. The coolant heater of claim 1, wherein the pump is formed in a cylindrical shape, and the heater assembly is formed to partially surround the circumference of a side surface of the pump.

7. The coolant heater of claim 1, wherein one heating sheet or the plurality of heating sheets is positioned per one heater unit.

8. The coolant heater of claim 7, wherein in the case where the plurality of heating sheets are positioned per on the one heater unit, the plurality of heating sheets positioned on the one heater unit are electrically connected in series or in parallel with each other.

9. The coolant heater of claim 1, further comprising: a terminal block supplying power by electrically connecting the heating sheets positioned on the plurality of heater units in series or in parallel with each other; and a controller connected to the terminal block and controlling the power supplied to the heating sheet.

10. The coolant heater of claim 9, wherein the terminal block is formed to extend in a direction in which the heater units are stacked on each other.

11. The coolant heater of claim 9, wherein the controller is formed in the shape of a substrate and stacked in parallel with the plurality of heater units.

12. The coolant heater of claim 11, wherein the controller is positioned to be spaced apart from the heater assembly.

* * * * *